(12) United States Patent
Kautny et al.

(10) Patent No.: US 8,780,425 B2
(45) Date of Patent: Jul. 15, 2014

(54) HOLOGRAPHIC STORAGE SYSTEM WITH IMPROVED BEAM OVERLAP

(75) Inventors: Szabolcs Kautny, Budapest (HU); Krisztian Banko, Ajka (HU); Gabor Szarvas, Budapest (HU); Zoltan Karpati, Pecs (HU)

(73) Assignee: Thomson Licensing, Issy-les-Moulineaux (FR)

( * ) Notice: Subject to any disclaimer, the term of this patent is extended or adjusted under 35 U.S.C. 154(b) by 768 days.

(21) Appl. No.: 12/589,204

(22) Filed: Oct. 20, 2009

(65) Prior Publication Data

US 2010/0097670 A1    Apr. 22, 2010

(30) Foreign Application Priority Data

Oct. 21, 2008    (EP) .................................... 08305707

(51) Int. Cl.
*G03H 1/10*    (2006.01)
*G03H 1/26*    (2006.01)
*G11B 7/00*    (2006.01)
*G11B 7/0065*    (2006.01)

(52) U.S. Cl.
CPC ................ *G03H 1/10* (2013.01); *G11B 7/0065* (2013.01)
USPC ............................... 359/10; 359/22; 369/103

(58) Field of Classification Search
CPC ............ G03H 1/02; G03H 1/26; G03H 1/16; G11B 7/0065; G11B 7/083; G02B 27/46
USPC ................. 359/3, 10, 11, 22, 24, 29; 369/103
See application file for complete search history.

(56) References Cited

U.S. PATENT DOCUMENTS

| | | | |
|---|---|---|---|
| 7,800,802 B2 * | 9/2010 | Kaneko et al. ..................... 359/3 |
| 7,835,048 B2 | 11/2010 | Szarvas et al. |
| 2008/0037085 A1 * | 2/2008 | Gabor et al. ..................... 359/24 |
| 2008/0252951 A1 * | 10/2008 | Knittel .............................. 359/22 |
| 2009/0245052 A1 * | 10/2009 | Usami ........................... 369/53.2 |
| 2009/0279406 A1 * | 11/2009 | Ogasawara .................... 369/103 |

FOREIGN PATENT DOCUMENTS

| | | |
|---|---|---|
| CN | 101162591 | 4/2008 |
| CN | 101165785 | 4/2008 |
| EP | 1 837 871 A | 9/2007 |
| EP | 1 912 212 A | 4/2008 |
| EP | 1 914 736 A | 4/2008 |
| EP | 1912212 | 4/2008 |

OTHER PUBLICATIONS

Search Report dated Dec. 12, 2008.

* cited by examiner

*Primary Examiner* — James Greece
*Assistant Examiner* — Jie Lei
(74) *Attorney, Agent, or Firm* — Myers Wolin LLC

(57) ABSTRACT

An apparatus and a method for reading from and/or writing to holographic storage media using a coaxial arrangement of an object beam and one or more reference beams or a coaxial arrangement of a reconstructed object beam and one or more reference beams is proposed. A focus of the one or more reference beams within a holographic storage medium is shifted along the optical axis relative to a focus of the object beam or the reconstructed object beam.

12 Claims, 4 Drawing Sheets

HOLOGRAPHIC STORAGE SYSTEM WITH IMPROVED BEAM OVERLAP

This application claims the benefit, under 35 U.S.C. §119 of European Patent Application No. 08305707.5, filed Oct. 21, 2008.

FIELD OF THE INVENTION

The present invention relates to an apparatus and a method for reading from and/or writing to holographic storage media, and more specifically to an apparatus and a method using a coaxial arrangement of an object beam and one or more reference beams, which achieves an improved beam overlap within a holographic storage medium. The invention further relates to a holographic storage medium suitable for use in such an apparatus or with such a method.

BACKGROUND OF THE INVENTION

In holographic data storage digital data are stored by recording the interference pattern produced by the superposition of two coherent laser beams, where one beam, the so-called 'object beam', is modulated by a spatial light modulator and carries the information to be recorded. The second beam serves as a reference beam. The interference pattern leads to modifications of specific properties of the storage material, which depend on the local intensity of the interference pattern. Reading of a recorded hologram is performed by illuminating the hologram with the reference beam using the same conditions as during recording. This results in the reconstruction of the recorded object beam.

One advantage of holographic data storage is an increased data capacity. Contrary to conventional optical storage media, the volume of the holographic storage medium is used for storing information, not just a few layers. One further advantage of holographic data storage is the possibility to store multiple data in the same volume, e.g. by changing the angle between the two beams or by using shift multiplexing, etc. Furthermore, instead of storing single bits, data are stored as data pages.

Typically a data page consists of a matrix of light-dark-patterns, i.e. a two dimensional binary array or an array of grey values, which code multiple bits. This allows to achieve increased data rates in addition to the increased storage density. The data page is imprinted onto the object beam by the spatial light modulator (SLM) and detected with a detector array.

EP 1 624 451 discloses a holographic storage system with a coaxial arrangement, where a plurality of reference beams are arranged around the object beam. According to this solution the object beam and the reference beams are coupled in and out at the object plane and the image plane, respectively. This arrangement is a so-called split aperture arrangement, because the aperture of the Fourier objective is split into an object part and a reference part. The arrangement has the advantage that the holographic material is near the Fourier plane, where the data density is the highest. Also, the overlap between the object beam and the reference beams is good near the Fourier plane. However, half of the aperture of the Fourier objective is used for the reference beams. This means that the capacity of a single hologram of the split aperture system is only half of the capacity of a common aperture arrangement. In addition, a total overlap of the object beam and the reference beams occurs only in the Fourier plane. The overlap is only partial within a 100-200 μm thick layer in the holographic storage medium. This value depends on the diameter of the hologram and the numerical aperture of the Fourier objective. Starting at a distance of about 200-400 μm from the Fourier plane there is no overlap at all. This limits the maximum useful thickness of the holographic material.

In WO2006/003077 a 12 f reflection type coaxial holographic storage arrangement with three confocally arranged Fourier planes is shown. In this arrangement the object beam and the reference beams are coupled in and out at the first and third Fourier planes, respectively. The reference beams are small spots in these planes. More precisely, they form diffraction patterns, similar to the Airy pattern. This arrangement is a so-called common aperture arrangement, because at the object plane and the image plane the object beam and the reference beams fill out the same area of the aperture. The beams fill out the entire aperture of the objectives. The disclosed arrangement allows to apply shift multiplexing, reference scanning multiplexing, phase coded multiplexing, or a combination of these multiplexing schemes. The reference beams are a pair (or pairs of) half cone shaped beams.

EP 1 912 212 discloses a holographic storage system with a coaxial arrangement of one or more reference beams and an object beam or a coaxial arrangement of one or more reference beams and a reconstructed object beam. The foci of the one or more reference beams are shifted relative to the focus of the object beam within the focal plane of the object beam or the reconstructed object beam.

EP 1 837 871 discloses a holographic storage medium with a holographic layer and a mirror layer. According to one embodiment the mirror layer has one or more reflective areas for reflecting one or more reference beams, whereas the remaining area of the mirror layer is transparent or absorptive.

In the known holographic storage systems the object beam and the reference beams do not fully overlap. To achieve a better overlap, the holographic material needs to be placed far from the Fourier plane. As a consequence, the single hologram data density in the holographic material is low.

SUMMARY OF THE INVENTION

It is an object of the invention to propose an apparatus and a method for reading from and/or writing to a holographic storage medium with an improved overlap of the object beam and the one or more reference beams.

It is a further object of the invention to propose a holographic storage medium, which is suitable for use in such an apparatus or with such a method.

According to the invention, in an apparatus for reading from and/or writing to a holographic storage medium, with a coaxial arrangement of one or more reference beams and an object beam or a coaxial arrangement of one or more reference beams and a reconstructed object beam, a focus of the one or more reference beams within the holographic storage medium is shifted along the optical axis relative to a focus of the object beam or the reconstructed object beam.

Likewise, a method for reading from and/or writing to a holographic storage medium using a coaxial arrangement of one or more reference beams and an object beam or a coaxial arrangement of one or more reference beams and a reconstructed object beam has the step of focusing the one or more reference beams to a focus within the holographic storage medium that is shifted along the optical axis relative to a focus of the object beam or the reconstructed object beam.

It has been found that it is not necessary to place the foci of the one or more reference beams into the Fourier plane of the object beam. If the Fourier plane and the focal plane of the one or more reference beams are shifted along the optical axis relative to each other, the overlap of the one or more reference beams and the object beam near the Fourier plane is greatly improved. This means that a desired data capacity is achieve with a reduced number of multiplexed holograms. This in turn leads to a better single hologram diffraction efficiency, as the finite dynamic range of the holographic material is shared between a reduced number of multiplexed holograms. The one or more reference beams advantageously are one cone-shaped or two half cone shaped reference beams, which are placed on or close to the optical axis.

Advantageously, the one or more reference beams are focused on a small reflective area of the holographic storage medium.

For this purpose, the holographic storage medium has a holographic layer and a mirror layer, which has one or more small reflective areas for reflecting the one or more reference beams, and which is transparent or absorptive otherwise. The small reflective areas favorably have a circular, oval or rectangular shape.

The small reflective areas reflect the one or more reference beams, whereas the object beam is practically not reflected by the mirror layer due to the very small size of the respective reflective area. Therefore, only a forward propagating object beam is present at the location of the holographic layer. This beam interferes with both the forward and the backward propagating reference beams, and records a hologram in the holographic material.

Advantageously, the holographic storage medium further has a spacer layer for separating the holographic layer and the mirror layer. The spacer layer allows do define the distance between the foci of the one or more reference beams and the focus of the object beam, and thus to optimize the overlap between the one or more reference beams and the object beam.

Preferably, for readout of a hologram the one or more reference beams are phase conjugate with regard to the one or more reference beams for recording of a hologram.

By using phase conjugate reference beams for readout of a holograms, a phase conjugate object beam is reconstructed. This reconstructed object beam has the same wavefront as the original object beam, but it propagates in the opposite direction. If this reconstructed object beam propagates back through all the same or identical lenses as the original object beam, the wavefront aberrations caused by the lenses are corrected when the reconstructed object beam passes through the lenses in the opposite direction.

Preferably, an objective for focusing the object beam and the one or more reference beams into the holographic storage medium is optimized for the reference beams only. As the wavefront aberrations of the object beam are automatically corrected due to the phase conjugate readout, it is not necessary to optimize the lens also for the object beam. This allows to make the objective lighter and less expensive, as the objective does not need to be diffraction limited on the whole Fourier plane, i.e. as the objective has a reduced requirement regarding wavefront distortions away from the optical axis.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

Figure 1:
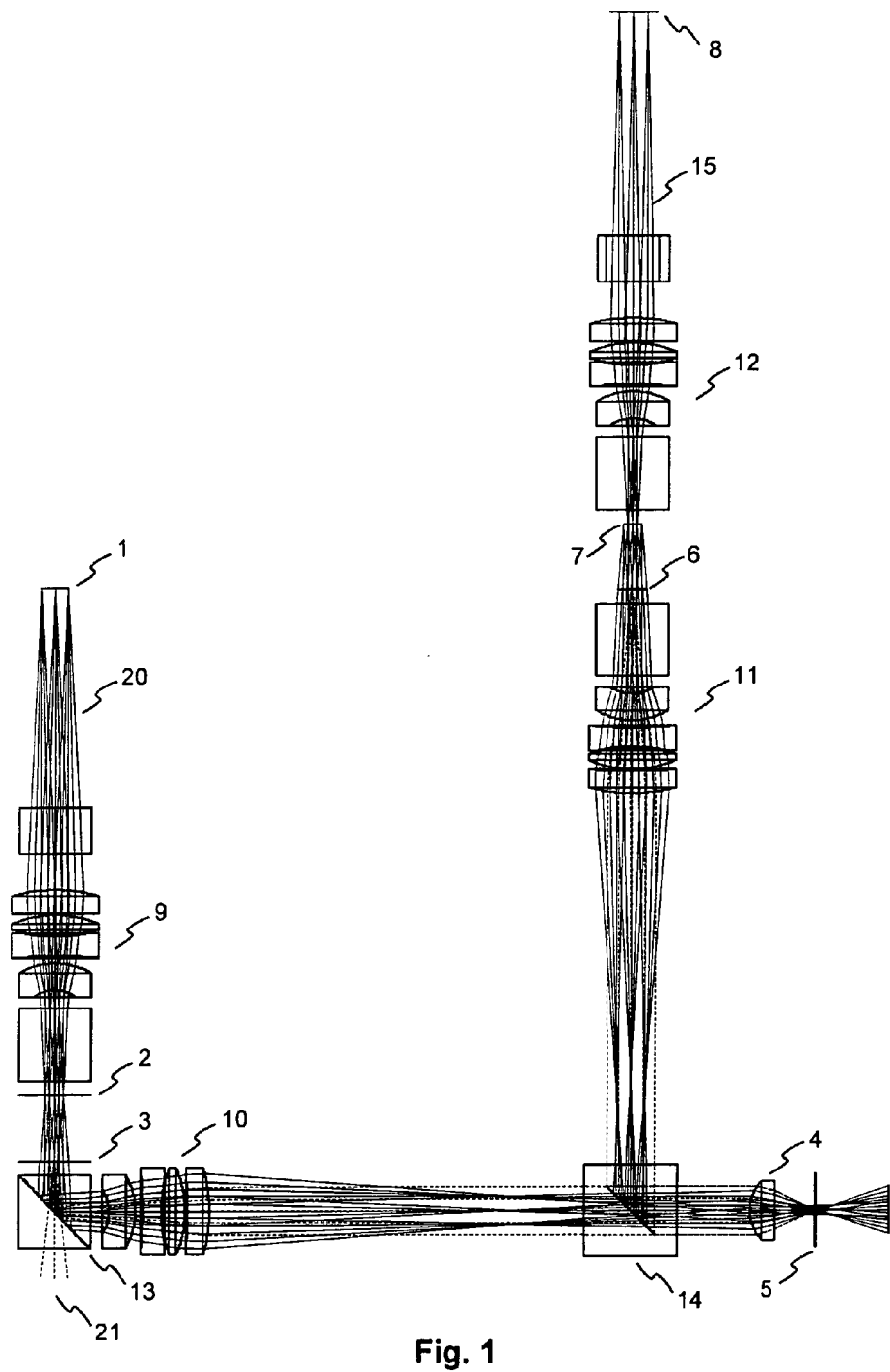
FIG. 1 illustrates the setup of a coaxial holographic storage system according to the invention.

A coaxial holographic storage system according to the invention is schematically illustrated in FIG. 1. For recording a hologram an object beam 20 coming from an amplitude SLM 1 is Fourier transformed by a first long focal length Fourier objective 9. This objective is one of four identical long focal length Fourier objectives 9, 10, 11, 12. Located in the Fourier plane of the first long focal length Fourier objective 9 is an aperture 2 for low pass filtering the Fourier image in order to reduce the high spatial frequency components of the image. The plane of the aperture 2 does not coincide with the focal plane 3 of the second Fourier objective 10, where a reference beam 21 is coupled in. More details on the beam coupling will be given below with reference to FIG. 3. The distance between the Fourier plane and the focus of the reference beam 21 is reproduced at the position of the holographic material. Both beams 20, 21 pass through the second long focal length objective 10 and a high NA objective 4 and reach a holographic storage medium 5.

Figure 2:
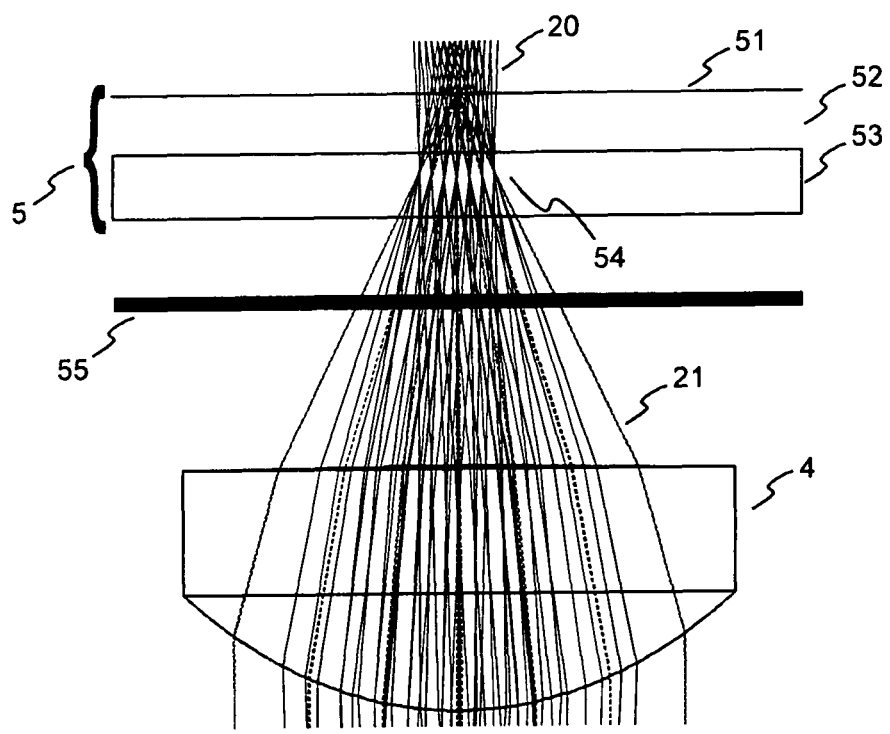
FIG. 2 depicts the reference beams and the object beam at the position of the holographic storage medium.
Figure 3:
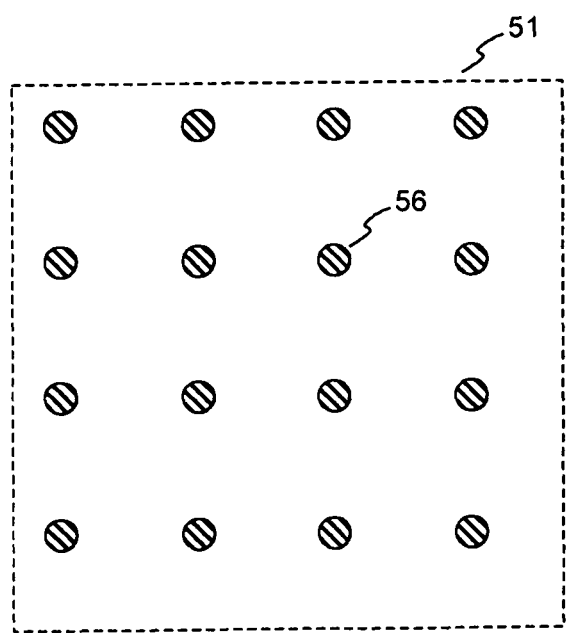
FIG. 3 shows a patterned mirror layer of the holographic storage medium.

At the incoupling plane 3 the reference beam 21 consists of one cone shaped light beam or two half cone shaped light beams arranged at a small distance from each other. In the following the term "reference beam" shall thus be understood as "one or more reference beams". The second objective 10 converts the reference beam 21 to one or two half-circle shaped plane waves that are almost parallel with the optical axis. The high NA objective 4 is optimized for converting these plane waves back to half cone shaped light beams, as illustrated in FIG. 2. The tips of these half-cone(s) are located on a patterned mirror layer 51, which has small reflective areas 56 at the respective focus positions, but is otherwise transparent. The diameter of the small reflective areas 56, which is determined by the numerical aperture, the laser wavelength and the precision of a servo system of the storage system, is about 1 μm. The patterned mirror layer 51 is illustrated in FIG. 3. In this figure the reflective areas 56 are small circular areas. Of course, these areas can also have other shapes, e.g. a rectangular or an oval shape. In addition, the mirror layer 51 may likewise be absorptive instead of transparent. The object beam 20 has a blurred focus 54 between the high NA objective 4 and the patterned mirror layer 51, which is similar to the Fourier plane. The high NA objective 4 is not optimized for the object beam 20, but for the reference beam 21. A holographic layer 53 of the holographic storage medium 5 is located around this focus. A spacer layer 52 is provided for ensuring a desired distance between the holographic material and the patterned mirror layer 51. The distance between the focus of the reference beam 21 and the focus of the object beam 20, as well as the thickness of the spacer layer 52, are optimized to reach the best overlap of the reference beam 21 and the object beam 20. The holographic layer 53, the spacer layer 52, and the patterned mirror layer 51 are all part of the holographic storage medium 5. Located between the high NA objective 4 and the holographic storage medium 5 is a quarter wave plate 55, whose function will be explained later.

The one or two half cone shaped light beams of the reference beam 21 form one or two full cones together with their reflected pairs. Since the object beam 20 is practically not reflected from the patterned mirror layer 51 due to the very small respective reflective area, only a forward propagating object beam 20 is present at the location of the holographic layer 53. This beam interferes with both the forward and the backward propagating reference beams 21, and records a hologram in the holographic material.

For reading a hologram the readout reference beam is similar to the reference beam 21 during recording, except that the half cone(s) are flipped. The forward propagating half-cone(s) of the reference beam 21 is substituted by the reflected half-cone(s) of the readout reference beam and vice versa. This means that the reference beam 21 during recording and the readout reference beam during reading are phase conjugated pairs of each other.

To make the implications of the use of phase conjugate beams clear, if a volume hologram is read by a readout reference beam, which is the phase conjugate version of the reference beam that was used for recording the hologram, the reconstructed object beam is the phase conjugate of the original object beam. This reconstructed object beam has the same wavefront as the original object beam, but it propagates in the opposite direction. If this reconstructed object beam propagates back through all the same or identical lenses as the original object beam, the wavefront aberrations caused by the lenses are corrected when the reconstructed object beam passes through the lenses in the opposite direction.

In the optical system illustrated in FIG. 1, the reconstructed object beam 15 first passes through the high NA objective 4. Then the beam is refracted by a polarization beam splitter cube 14. After passing through the third long focal length objective 11, the readout reference beam is stopped by an obscuration plate 6 at its focus. The Fourier transformed object is reconstructed in a plane 7, where it is cut by a circular aperture. Finally, the fourth long focal length objective 12 performs an inverse Fourier transformation of the reconstructed object beam 15 and images the reconstructed image on a detector 8.

Figure 4:
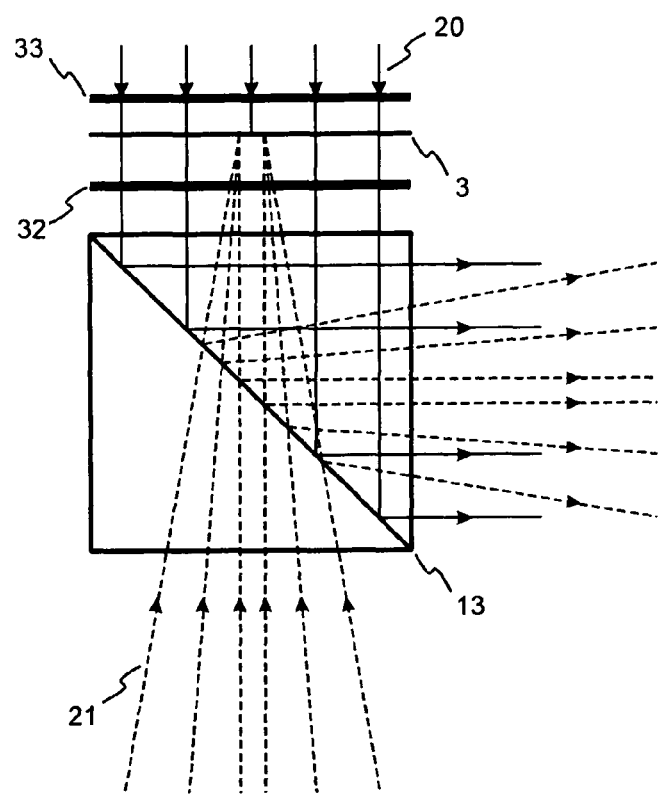
FIG. 4 shows the incoupling scheme for the reference beams.

The incoupling of the reference beam 21 and the separation of the optical paths of the object beam 20 and the reconstructed object beam 15 are achieved using polarization. This is illustrated in FIG. 4. As depicted in FIGS. 2 and 4, there are three quarter wave plates in the system. A first one 32 is located between the incoupling plane 3 and the polarizing beam splitter cube 13, a second one 33 before the incoupling of the reference beam 21 in the object beam path, and a third one 55 between the objective 4 and the holographic storage medium 5. This ensures that the object beam 20 as well as the reference beam cones are circularly polarized at the incoupling plane of the reference beam 21 and also inside the holographic storage medium 5, while they are linearly polarized along the remaining optical path.

Using the optical setup of FIG. 1, hologram multiplexing is performed by shifting the holographic storage medium 5 to the next reflective area of the patterned mirror layer 51. In this position the hologram overlaps with the previous hologram, which allows to increase the data density.

Favorably, a random phase mask is arranged in front of the amplitude SLM 1, which eliminates the high intensity peak in the middle of Fourier plane. This is especially useful when the Fourier plane is inside the holographic material. The phase mask modulates the phase of each pixel by 0 or $\pi$. The number of white pixels that have 0 and $\pi$ phase shift should be approximately identical.

Figure 5:
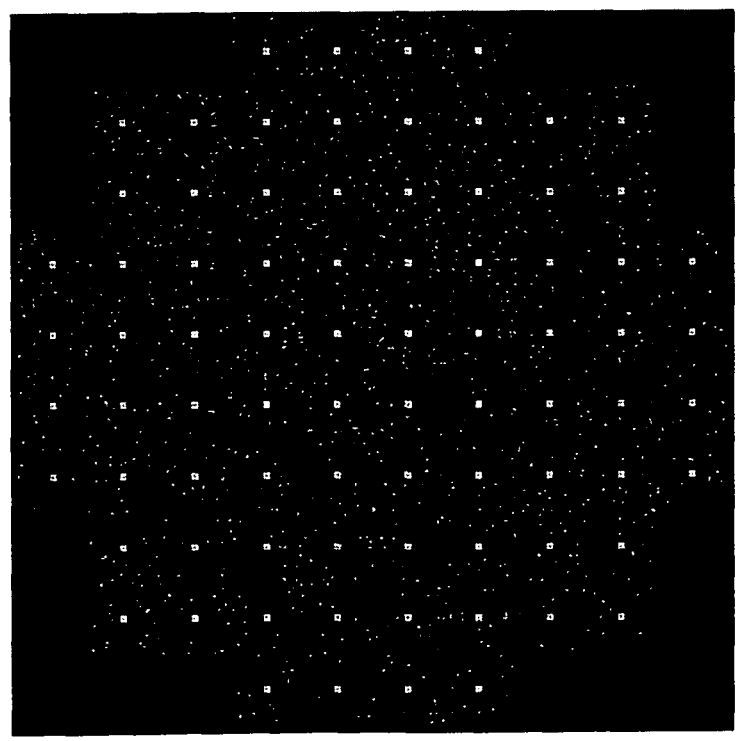
FIG. 5 depicts simulation results for the holographic storage system based on a first set of system parameters.

In the following simulation results obtained for the proposed holographic storage system using the beam propagation method shall be presented. FIG. 5 shows a simulation result of the detector image based on the following first set of system parameters:
Spacer layer thickness: 700 μm
Defocus: 700 μm
Active material thickness: 300 μm
Distance between object beam and reference cone axis: 10 μm
Reference/object energy ratio: 1000/1
SLM: normal amplitude SLM, 10 μm pixel size
Reference incoupling diameter (at focus): 6 μm
Reference outcoupling diameter: 20 μm
Wavelength: 400 nm
Material refractive index: 1.5
Objective focal distance: 7 mm
Fourier plane cut diameter: 0.6×DNyquist
The symbol error rate for these parameters was zero, no errors occurred.

Figure 6:
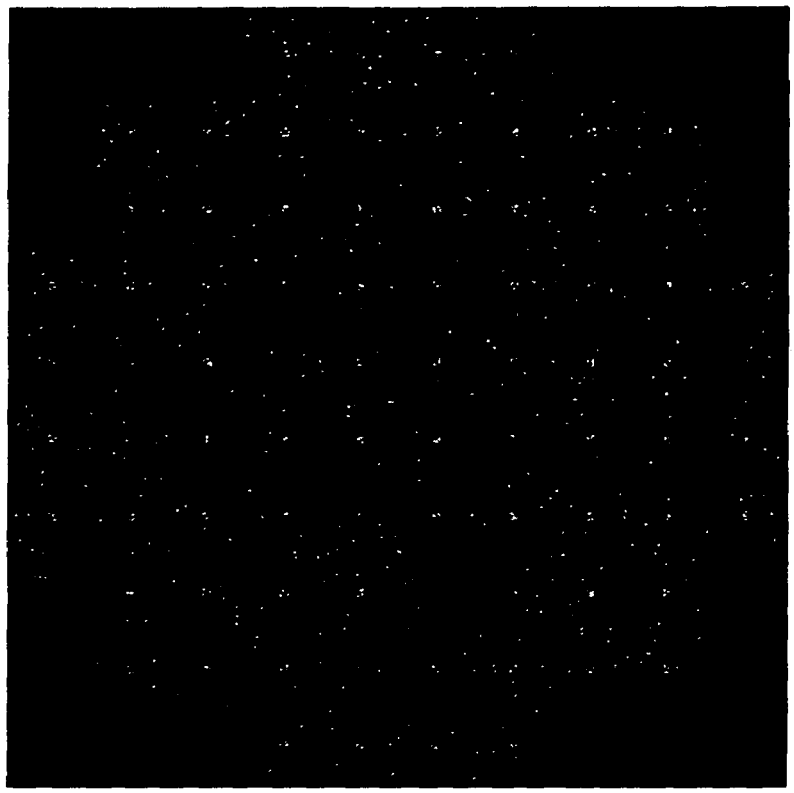
FIG. 6 shows simulation results for the holographic storage system based on a second set of system parameters.

FIG. 6 shows a simulation result of the detector image with the following second set of system parameters:
Spacer layer thickness: 500 μm
Defocus: 600 μm
Active material thickness: 300 μm
Distance of object beam and reference cone axis: 0 μm (coaxial)
Reference/object energy ratio: 20/1
SLM: random phase masked, 10 μm pixel size
Reference incoupling diameter (at focus): 6 μm
Reference outcoupling diameter: 20 μm
Wavelength: 400 nm
Material refractive index: 1.5
Objective focal distance: 7 mm
Fourier plane cut diameter: 0.6×Dnyquist
The symbol error rate for these parameters was SER=0.04%, two errors occurred within 4800 blocks.

What is claimed is:

1. An apparatus for reading from or writing to a holographic storage medium, with a coaxial arrangement of one or more reference beams and an object beam or a coaxial arrangement of one or more reference beams and a reconstructed object beam, wherein a focus of the one or more reference beams within the holographic storage medium is located on an optical axis of the object beam or the reconstructed object beam and shifted along the optical axis relative to a focus of the object beam or the reconstructed object beam.

2. The apparatus according to claim 1, wherein the one or more reference beams are focused on a small reflective area of the holographic storage medium.

3. The apparatus according to claim 1, wherein for readout of a hologram the one or more reference beams are phase conjugate with regard to the one or more reference beams for recording of a hologram.

4. The apparatus according to claim 1, wherein the one or more reference beams are one cone shaped or two half cone shaped reference beams.

5. The apparatus according to claim 1, wherein an objective for focusing the object beam and the one or more reference beams into the holographic storage medium is optimized for the reference beams only.

6. A method for reading from or writing to a holographic storage medium using a coaxial arrangement of one or more reference beams and an object beam or a coaxial arrangement of one or more reference beams and a reconstructed object beam, the method comprising focusing the one or more reference beams to a focus within the holographic storage medium that is located on an optical axis of the object beam or the reconstructed object beam and shifted along the optical axis relative to a focus of the object beam or the reconstructed object beam.

7. The method according to claim 6, wherein the one or more reference beams are focused on a small reflective area of the holographic storage medium.

8. The method according to claim 6, wherein for readout of a hologram the one or more reference beams are phase conjugate with regard to the one or more reference beams for recording of a hologram.

9. The method according to claim 6, wherein the one or more reference beams are one cone shaped or two half cone shaped reference beams.

10. A holographic storage medium with a holographic layer and a patterned mirror layer, the patterned mirror layer comprising one or more reflective areas configured to reflect one or more reference beams, which are surrounded by a transparent or absorptive area of the patterned mirror layer, wherein the reflective areas have a size of about 1 µm.

11. The holographic storage medium according to claim 10, further comprising a spacer layer configured to separate the holographic layer and the patterned mirror layer.

12. The holographic storage medium according to claim 10, wherein the small reflective areas have a circular, oval or rectangular shape.

* * * * *